USO05553647A

United States Patent [19]
Jaksic

[11] Patent Number: 5,553,647
[45] Date of Patent: Sep. 10, 1996

[54] CENTRAL TIRE INFLATION SYSTEM

[75] Inventor: Miroslav Jaksic, Ypsilanti, Mich.

[73] Assignee: Hayes Wheels International, Inc., Romulus, Mich.

[21] Appl. No.: 355,725

[22] Filed: Dec. 14, 1994

[51] Int. Cl.$^6$ .................................................. B60C 23/00
[52] U.S. Cl. ........................................................... 152/415
[58] Field of Search ................................... 152/415, 416, 152/417, 418

[56]  References Cited

U.S. PATENT DOCUMENTS

| | | | |
|---|---|---|---|
| 4,583,566 | 4/1986 | Kalavitz et al. | 152/416 X |
| 4,619,303 | 10/1986 | Bryan et al. | 152/416 |
| 4,754,792 | 7/1988 | Braun et al. | 152/417 |
| 4,782,879 | 11/1988 | Le Chatelier et al. | 152/417 |
| 4,825,925 | 5/1989 | Schultz | 152/415 |
| 4,860,579 | 8/1989 | Beverly | 152/416 X |
| 4,883,105 | 11/1989 | Schultz | 152/416 |
| 4,893,664 | 1/1990 | Oltean | 152/416 |
| 4,898,216 | 2/1990 | Schultz et al. | 152/417 X |
| 4,917,163 | 4/1990 | Schultz | 152/415 |
| 4,922,946 | 5/1990 | Boulicault | 152/416 X |
| 4,924,926 | 5/1990 | Schultz et al. | 152/417 |
| 5,180,456 | 1/1993 | Schultz et al. | 152/416 |
| 5,244,027 | 9/1993 | Freigang | 152/416 |
| 5,253,687 | 10/1993 | Beverly et al. | 152/416 |

*Primary Examiner*—Michael W. Ball
*Assistant Examiner*—Francis J. Lorin
*Attorney, Agent, or Firm*—MacMillan, Sobanski & Todd

[57]  ABSTRACT

An improved central tire inflation system wherein positive air pressure is used to control the air pressure in the associated vehicle tire includes a vehicle wheel assembly having a tire mounted thereon and defining a pressurized tire air chamber, and a positive pressure air source. A normally closed inflation valve is connected between the tire air chamber and the positive pressure air source, and a normally closed deflation valve is connected between the tire air chamber and the atmosphere. A control valve selectively actuated by a central control unit is provided to operatively connect the inflation valve and the deflation valve to the positive pressure air source. The system further includes a sensor for measuring the tire pressure in the tire air chamber. The sensor is operative to generate a signal corresponding to the air pressure in the tire air chamber to the central control unit. In operation, the inflation valve is responsive to an air actuation signal at a selected positive pressure for moving the inflation valve to an open position to thereby increase the air pressure in the tire air chamber, and the deflation valve is responsive to an air actuation signal at a selected positive pressure for moving the deflation valve to an open position to thereby decrease the air pressure in the tire air chamber.

6 Claims, 2 Drawing Sheets

CENTRAL TIRE INFLATION SYSTEM

BACKGROUND OF THE INVENTION

This invention relates to in general to vehicle tire inflation and, in particular, to a vehicle central tire inflation system.

A central tire inflation system (CTIS) is an onboard tire inflation (and typically deflation) system which is operative to monitor and adjust the air pressure in the associated tires of the vehicle.

One example of a CTIS is disclosed in U.S. Pat. No. 5,253,687 to Beverly et al. In the Beverly et al. patent, the CTIS includes a separate wheel valve assembly affixed to each vehicle wheel. The wheel valve assembly includes an inlet port connected to an air control circuit of the CTIS, an outlet port connected to an inflatable volume tire chamber, and an exhaust port connected to atmosphere. In operation, the CTIS is operative to maintain the wheel valve assembly in a normally closed position when air pressure to the inlet port is at atmospheric pressure. When a sufficient positive air pressure is supplied to the inlet port, the valve assembly assumes an open position connecting the inlet port to the outlet port to inflate the tire. When a negative air pressure is supplied to the inlet port, the valve assembly assumes an exhaust position connecting the outlet port to the exhaust port to deflate the tire.

SUMMARY OF THE INVENTION

This invention relates to an improved central tire inflation system wherein positive air pressure is used to control the air pressure in the associated vehicle tire. In particular, the central tire inflation system includes a vehicle wheel assembly including a tire mounted on a vehicle wheel and defining a pressurized tire air chamber, and a positive pressure air source. A normally closed tire inflation valve is connected between the pressurized tire air chamber and the positive pressure air source, and a normally closed tire deflation valve is connected between the pressurized tire air chamber and the atmosphere. Further, a control valve is provided to operatively connect the inflation valve and the deflation valve to the positive pressure air source. The control valve is selectively actuated by a central control unit. The central tire inflation system further includes a sensor for measuring the tire pressure in the pressurized tire air chamber. The sensor is operative to generate a signal corresponding to the air pressure in the pressurized tire air chamber to the central control unit. In operation, the inflation valve is responsive to an air actuation signal at a selected positive pressure for moving the inflation valve to an open position to thereby increase the air pressure in the pressurized tire air chamber, and the deflation valve is responsive to an air actuation signal at a selected positive pressure for moving the deflation valve to an open position to thereby decrease the air pressure in the pressurized tire air chamber.

As will be discussed in more detail below, the use of positive air pressure (rather than vacuum) to decrease the pressure in tire air chamber enables the system to accommodate more leakage through the rotary seal without causing system failure.

Other advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
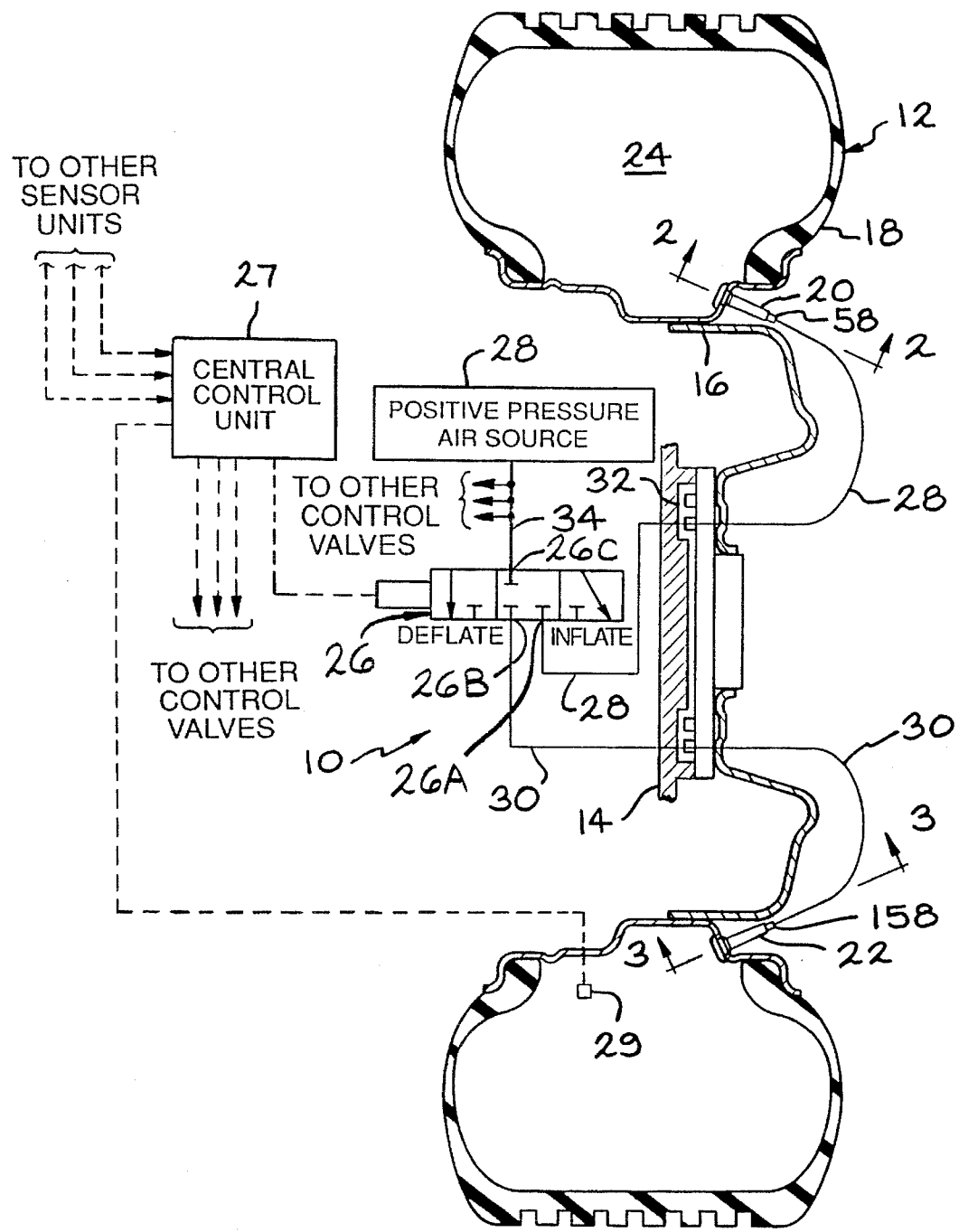
FIG. 1 is a schematic view of an improved central tire inflation system constructed in accordance with the present invention.

Referring now to the drawings, there is illustrated in FIG. 1 a schematic view of an improved central tire inflation system (hereinafter "CTIS"), indicated generally at 10, and constructed in accordance with the present invention. As shown in this embodiment, the CTIS 10 includes a vehicle wheel assembly 12 which is supported along with a rotatable vehicle component such as, for example, a rotor 14 (partially shown) of a disc brake assembly (not shown) in a known manner. The rotor 14 is rotatably secured to a vehicle component such as, for example, a wheel spindle (not shown) in a known manner.

The vehicle wheel assembly 12 includes a wheel 16, a tire 18 mounted on the wheel 16, a wheel inflation valve 20, and a wheel deflation valve assembly 22. The tire 18 and the wheel 16 cooperate to define an internal tire air chamber 24.

As shown in this embodiment, the CTIS 10 includes an electromagnetically actuated three position, three-way control valve 26, and a positive pressure air source 28. Preferably, the positive pressure air source 28 is an on-board air source which is capable of supplying air at sufficient volume and pressure to actuate the valve assemblies 20 and 22 and inflate and deflate, respectively, the associated tire of the vehicle at a desired rate. The air source 28 can comprise an air compressor (not shown) connected to an air reservoir (not shown) which can be, for example, a spare tire (not shown) of the vehicle. Preferably, a separate control valve 26 is utilized to selectively supply air from air source 28 to each vehicle wheel assembly 12. Thus, the pressure of each tire of the vehicle can be independently controlled.

The control valve 26 ks selectively actuated by a central control unit 27. The control unit 27 is operative to selectively control the air pressure to each of the associated tires of the vehicle, and is typically mounted in the interior of the vehicle so that it can be controlled by the driver during operation of the vehicle. The control valve 26 includes a first port 26A connected to the wheel inflation valve assembly 20 by an air supply line 28, and a second port 26B connected to the wheel deflation valve assembly 22 by an air supply line 30. In order to supply pressurized air to the supply lines 28 and 30, a third port 26C of the control valve 26 is connected to the positive pressure air source 28 by an air supply line 34.

The CTIS 10 further includes a rotary seal assembly 32. Also, as shown in this embodiment, an air pressure detecting sensor unit 29 is provided at each vehicle wheel 12. The sensor unit 29 measures the air pressure in the vehicle wheel 12, and is operative to generate an electrical signal corresponding to this air pressure to the central control unit 27.

Figure 2:
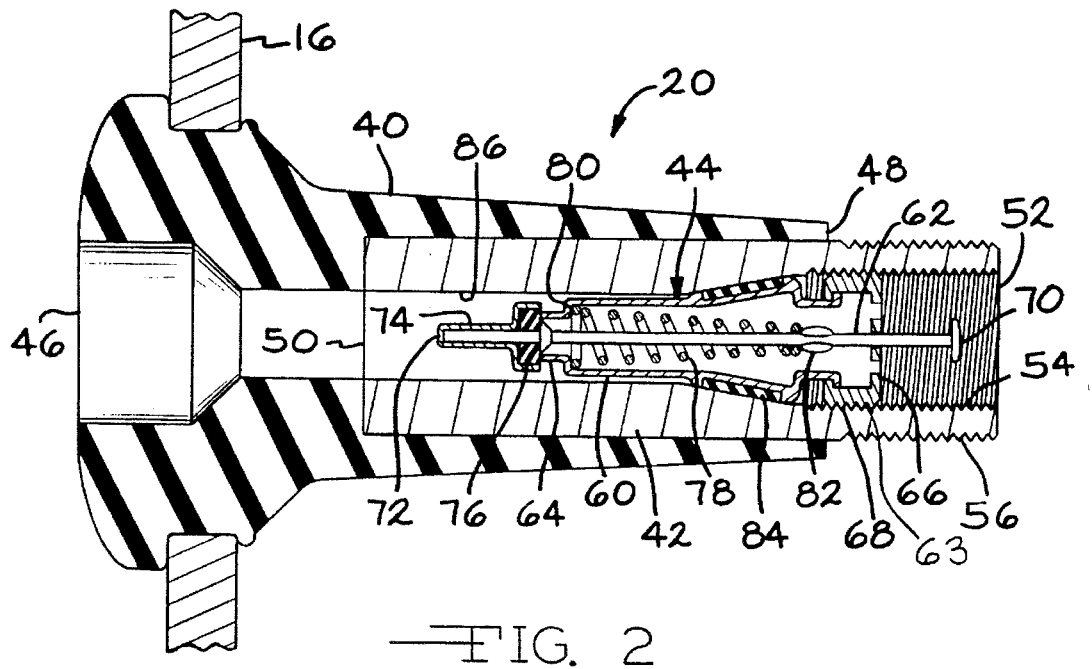
FIG. 2 is an enlarged cross-sectional view taken along line 2—2 of FIG. 1, and showing one example of a wheel inflation valve assembly.

Turning now to FIG. 2, the construction of one example of the wheel inflation valve assembly 20 will be discussed. As shown therein, the wheel inflation valve 20 includes an outer housing 40 having a molded-in hollow insert 42 which retains a plunger assembly 44. The housing includes a pair of opposed open ends 46 and 48, and can be formed from rubber.

The insert 42 includes an open end 50 disposed within the housing 40, and an open end 52 which extends outwardly from the open end 48 of the housing 40. The insert 42 can be formed from stainless steel. The end 52 of the insert 44 defines an inlet of the valve 20, and is provided with internal threads 54 and external threads 56. Preferably, a removable air-tight connector 58 (shown in FIG. 1) is threadably secured on the threaded end 52 of the insert 42 to connect the supply line 28 to the wheel inflation valve assembly 20. As will be discussed below, the tire inflation valve assembly 20 is constructed to enable the pressure within the associated tire air chamber 24 to be manually increased or decreased in a known manner (once the connector 58 is removed).

The plunger assembly 44 includes an outer housing 60, an internal reciprocal piston rod 62, and a fitting 63. The housing 60 includes an open inner end 64, and the fitting 63 includes an open outer end 66 provided with external threads 68 for threadably securing the housing 60 in the end 52 of the insert 42.

The piston rod 62 includes an enlarged head 70 which extends outwardly past the outer end 66 of the fitting 63, and an opposite end 72. The end 72 includes a stepped body 74 and an elastomeric seal 76. A spring 78 is carried by the piston rod 62, and is supported between a shoulder 80 defined at the end 64 of the housing 60, and an enlarged portion 82 of the piston rod 62. Also, a seal member 84 is carried by the housing 60 and engages an inner surface 86 of the insert 42.

As shown in FIG. 2, the seal 76 is normally biased by the spring 78 against the end 64 of the insert 60 to maintain the valve 20 in a closed position to prevent air flow through the valve 20. As will be discussed below, when a force is supplied to the inlet 52 of the valve 20 which is sufficient to overcome the pressure of the air in the tire chamber 24 and the force of the spring 78, the piston rod 62 is moved to the left in the drawing to open the valve 20 (not shown) and allow air to flow to the tire chamber 24 to inflate the tire to a desired higher pressure.

Figure 3:
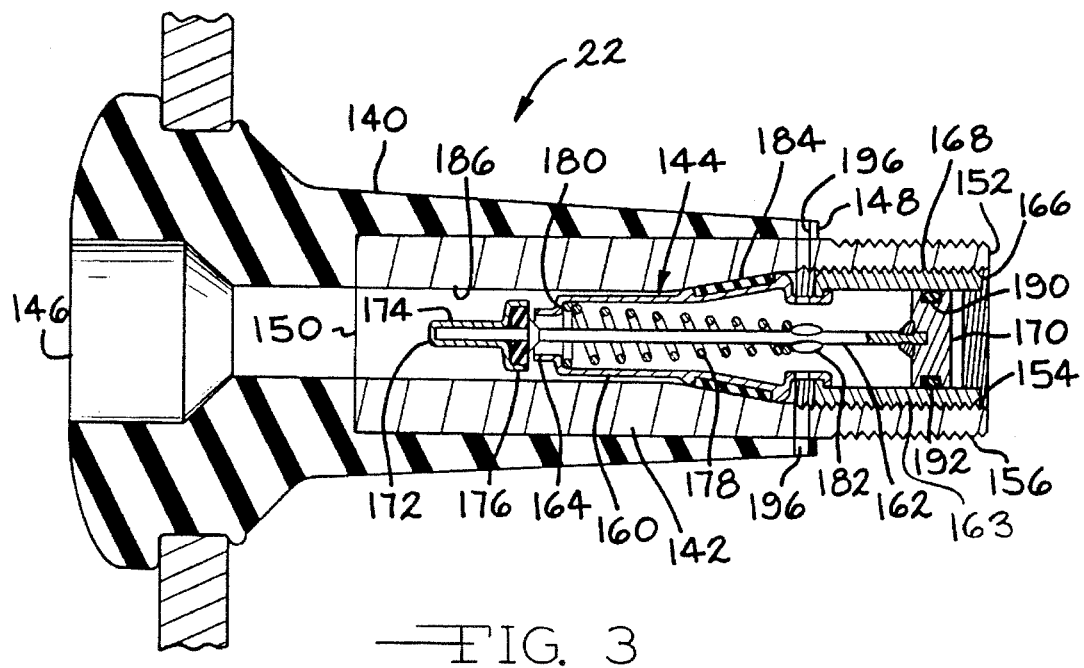
FIG. 3 is an enlarged cross-sectional view taken along line 3—3 of FIG. 1, and showing one example of a wheel deflation valve assembly.

Turning now to FIG. 3, the construction of one example of a wheel deflation valve assembly 22 will be discussed. As shown therein, the wheel deflation valve 22 includes an outer housing 140 having a molded-in insert 142 which retains a plunger assembly 144. The housing 140 includes a pair of opposed open ends 146 and 148, and can be formed from rubber.

The insert 142 includes an open end 150 disposed within the housing 140, and an open end 152 which extends outwardly from the open end 148 of the housing 140. The insert 142 can be formed from stainless steel. The end 152 of the insert 144 defines an inlet of the valve 22, and is provided with internal threads 154 and external threads 156. Preferably, a removable air-tight connector 158 (shown in FIG. 1) is threadably secured on the threaded end 152 of the insert 142 to connect the supply line 30 to the wheel deflation valve assembly 22.

The plunger assembly 144 includes an outer housing 160, an internal reciprocal piston rod 162, and a fitting 163. The housing 160 includes an open end 164, and the fitting 163 is provided with external threads 168 for threadably securing the housing 160 in the end 152 of the insert 142.

The piston rod 162 carries an enlarged head 170 which is disposed within the fitting 163, and an includes an opposite end 172. The end 170 includes an annular groove 190 formed therein, and the end 172 includes a stepped body 174. An elastomeric seal 192 is disposed in the groove 190, and an elastomeric seal 176 is disposed in the body 174. A spring 178 is carried by the piston rod 162, is and supported between a shoulder 180 defined at the end 164 of the housing 160, and an enlarged portion 182 of the piston rod 162. Also, a seal member 184 is carried by the housing 160 and engages an inner surface 186 of the insert 142. The seal 176 is normally biased by the spring 178 against the end 164 of the insert 160 to a closed position prevent air flow through the valve 22.

As shown in this embodiment, the wheel deflation valve assembly 22 further includes a pair of axially extending exhaust ports 196 formed therein. In particular, the exhaust ports 196 extend through the housing 140, the insert 142, and the plunger assembly housing 160. As will be discussed below, when a force is supplied to the inlet 152 of the valve 22 which is sufficient to overcome the pressure of the air in the tire chamber and the force of the spring 178, the piston rod 162 is moved to the left as shown in FIG. 3 to open the valve 22 and allow air to flow from the tire chamber 24 to the atmosphere via the exhaust ports 196 to deflate the tire to a desired lower pressure.

The operation of the CTIS 10 of the present invention will now be discussed. When the pressure in the tire air chamber 24 is at a desired level, the control valve 26 is in its normal position shown in FIG. 1. In this position, the valve 26 is inoperative to supply air from the supply line 34 to the tire air chamber 24 via supply line 28 or supply line 30.

If it is desired to increase the air pressure in the tire air chamber 24 to a desired higher pressure, the control valve 26 is selectively energized to allow the supply line 34 from the positive pressure air source 26 to supply air to the supply line 28 connected to the wheel inflation valve 20. So long as the pressure of the air in the supply line 28 is greater than the pressure of the air in the tire air chamber 24 and the force of the spring 78, the inflation valve 20 is maintained in an open position. The control valve 26 remains open until the sensor unit 29 generates a signal that the pressure in the tire air chamber 24 has been increased to the desired higher pressure.

If it is desired to decrease the air pressure in the tire air chamber 24 to a desired lower pressure, the valve 26 is selectively energized to allow the supply line 34 from the positive pressure air source 26 to supply air to the supply line 30 connected to wheel deflation valve assembly 22. So long as the pressure of air in the supply line 30 is greater than the pressure of air in the tire air chamber 24 and the force of the spring 178, the deflation valve 22 is maintained in an open position. The control valve 26 remains open until the sensor unit 29 generates a signal that the pressure in the tire air chamber 24 has been decreased to the desired lower pressure.

Also, due to the construction of the inflation valve 20 of the present invention, the pressure within the associated tire can be manually increased or decreased in a known manner once the connector 58 is removed.

One advantage of the present invention is that only a positive pressure air source is used to both inflate and deflate the associated tire of the vehicle. In the prior art, a positive pressure air source was used for inflation, and a vacuum air source was used for deflation. Also, since the present invention uses a positive pressure air source for both inflation and deflation, some air leakage through the rotary seal will not cause system failure. In particular, during deflation, some air leakage through the rotary seal will not prevent the system from operating. In the prior art, since a vacuum was used for deflation, some air leakage through the rotary seal prevented the system from operating.

While the present invention has been described and illustrated as using the particular control valve 26 disclosed herein, other control valves can be used. For example, a pair of two position, two-way control valves (not shown) can be used. Also, while the invention has been described and illustrated as using a wheel inflation valve assembly 20 and a wheel deflation valve assembly 22, other wheel valve assemblies can be used. For example, a single wheel valve assembly (not shown) which is actuated by positive air pressure to selectively inflate and deflate the tire air chamber can replace the separate wheel valve assemblies 20 and 22.

In accordance with the provisions of the patent statutes, the principle and mode of operation of this invention have been described and illustrated in its preferred embodiment. However, it must be understood that the invention may be practiced otherwise than as specifically explained and illustrated without departing from the spirit or scope of the attached claims.

What is claimed:

1. A system for controlling air pressure in a tire of a vehicle comprising:

a vehicle wheel assembly including a tire mounted on a vehicle wheel and defining a pressurized tire air chamber;

a positive pressure air source;

a normally closed inflation valve connected between said pressurized tire air chamber and said positive pressure air source, and a single air supply line connecting said positive pressure air source to said inflation valve to both actuate said inflation valve, wherein said inflation valve is moved to an open position in response to an air actuation signal at a selected positive pressure, and to supply pressurized air from said positive pressure air source to thereby increase the air pressure in said pressurized tire air chamber; and a normally closed deflation valve connected between said pressurized tire air chamber and atmosphere, said deflation valve responsive to an air actuation signal at a selected positive pressure for moving said deflation valve to an open position to thereby decrease the air pressure in said pressurized tire air chamber.

2. The system defined in claim 1 and further including a control valve operatively connecting said inflation valve and said deflation valve to said positive pressure air source.

3. The system defined in claim 2 and further including a central control unit for selectively actuating said control valve.

4. The system defined in claim 3 and further including a sensor for measuring the air pressure in said pressurized tire air chamber, said sensor operative to generate a signal corresponding to the air pressure in said pressurized tire air chamber to said central control unit.

5. The system defined in claim 1 wherein said inflation valve and said deflation valve are separate valves.

6. The system defined in claim 2 wherein said control valve is an electromagnetically actuated three position, three-way control valve.

* * * * *